United States Patent
Raybern

(10) Patent No.: US 12,551,017 B2
(45) Date of Patent: Feb. 17, 2026

(54) LEG REST EXTENSION MECHANISM AND METHOD FOR OPERATING THE LEG REST EXTENSION MECHANISM

(71) Applicant: Textron Innovations Inc., Providence, RI (US)

(72) Inventor: Blake David Raybern, Wichita, KS (US)

(73) Assignee: TEXTRON INNOVATIONS INC., Providence, RI (US)

( * ) Notice: Subject to any disclaimer, the term of this patent is extended or adjusted under 35 U.S.C. 154(b) by 214 days.

(21) Appl. No.: 18/238,365

(22) Filed: Aug. 25, 2023

(65) Prior Publication Data

US 2025/0064213 A1 Feb. 27, 2025

(51) Int. Cl.
  *A47C 7/50* (2006.01)
(52) U.S. Cl.
  CPC .................... *A47C 7/5068* (2018.08)
(58) Field of Classification Search
  CPC .......................... A47C 7/5068; B64D 11/0643
  See application file for complete search history.

(56) References Cited

U.S. PATENT DOCUMENTS

| 4,718,716 | A | * | 1/1988 | Stumpf | A47C 1/0345 |
| | | | | | 297/316 |
| 11,167,852 | B1 | * | 11/2021 | Vanhoy | B64D 11/0643 |
| 2013/0175847 | A1 | * | 7/2013 | Lawson | A61G 5/14 |
| | | | | | 297/85 M |
| 2019/0365107 | A1 | * | 12/2019 | Last | A47C 1/022 |
| 2020/0015596 | A1 | * | 1/2020 | Carrera | A47C 7/503 |
| 2020/0029696 | A1 | * | 1/2020 | Romano | A61G 15/12 |
| 2020/0216179 | A1 | * | 7/2020 | Last | B64D 11/0643 |
| 2022/0061533 | A1 | * | 3/2022 | Mackert | A47C 7/5068 |

* cited by examiner

*Primary Examiner* — David R Dunn
*Assistant Examiner* — Tania Abraham
(74) *Attorney, Agent, or Firm* — SLATER MATSIL, LLP

(57) ABSTRACT

In an embodiment a leg rest includes a mounting fixture, an extension frame and a deployment and stowage mechanism configured to deploy the leg rest from or stow the leg rest to a seat, wherein the extension frame is movably connected to the mounting fixture so that the extension frame moves relative to the mounting fixture when the deployment and stowage mechanism moves the leg rest relative to the seat.

18 Claims, 17 Drawing Sheets

LEG REST EXTENSION MECHANISM AND METHOD FOR OPERATING THE LEG REST EXTENSION MECHANISM

TECHNICAL FIELD

The present invention relates generally to a system and method for a leg rest, and, in particular embodiments, to a system and method for a leg rest of an airplane seat.

BACKGROUND

Various motorized leg rests for aircraft seats are known.

SUMMARY

Embodiments provide a leg rest comprising a mounting fixture, an extension frame and a deployment and stowage mechanism configured to deploy the leg rest from or stow the leg rest to a seat, wherein the extension frame is movably connected to the mounting fixture so that the extension frame moves relative to the mounting fixture when the deployment and stowage mechanism moves the leg rest relative to the seat.

Further embodiments provide a leg rest comprising a mounting fixture and an extension frame comprising a leg rest pad, a first telescope rail arranged between mounting fixture and the extension frame guidable connecting the extension frame and the mounting fixture, a spring arranged between the mounting fixture and the extension frame, the spring configured to provide a force to move the extension frame to a distal position relative to the mounting fixture, a retraction mechanism comprising a cam and a cable, wherein the cam is pivotally connected to the mounting fixture, and wherein one end of the cable is connected to the extension frame and another end of the cable is connected to the cam and a deployment and stowage mechanism comprising a plurality of linkages configured to deploy or stow the leg rest from a seat, wherein, when the deployment and stowage mechanism stows the leg rest, the cam is pivotally rotated by a first linkage of the plurality of linkages thereby reeling in the cable and moving the extension frame from the distal position with respect to the mounting fixture to a proximal position with respect to the mounting fixture.

Other embodiments provide a method for extending a leg rest from a seat. The method comprises deploying the leg rest from a stowed position at the seat to a deployed position extended from the seat, while deploying the leg rest, moving an extension frame of the leg rest away from a mounting fixture of the leg rest so that the extension frame is moved from a proximal position with respect to the mounting fixture to a distal position, wherein a connector guides the extension frame with respect to the mounting fixture, and wherein the extension frame is moved by an extension force being larger than a retraction force, retracting the leg rest from the deployed position to the stowed position, and, while retracting the leg rest, moving the extension frame towards the mounting fixture so that the extension frame is moved from the distal position to the proximal position, wherein the extension frame is moved by the retraction force being larger than the extension force.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Embodiments provide a leg rest with an extendable leg rest pad. The leg rest may be moved relative to a seat by a deployment and stowage mechanism, and an extension and retraction mechanism, which work in tandem with each other. Embodiments comprise an extension and retraction mechanism configured to move a mounting fixture and an extension frame. The mounting fixture and the extension frame may advantageously each being U shaped and advantageously facing each other with the open part of the U. In further embodiments the extension and retraction mechanism includes a cable tensioner system as an interface between the deployment and stowage mechanism, and the mounting fixture and the extension frame.

Figure 1A:
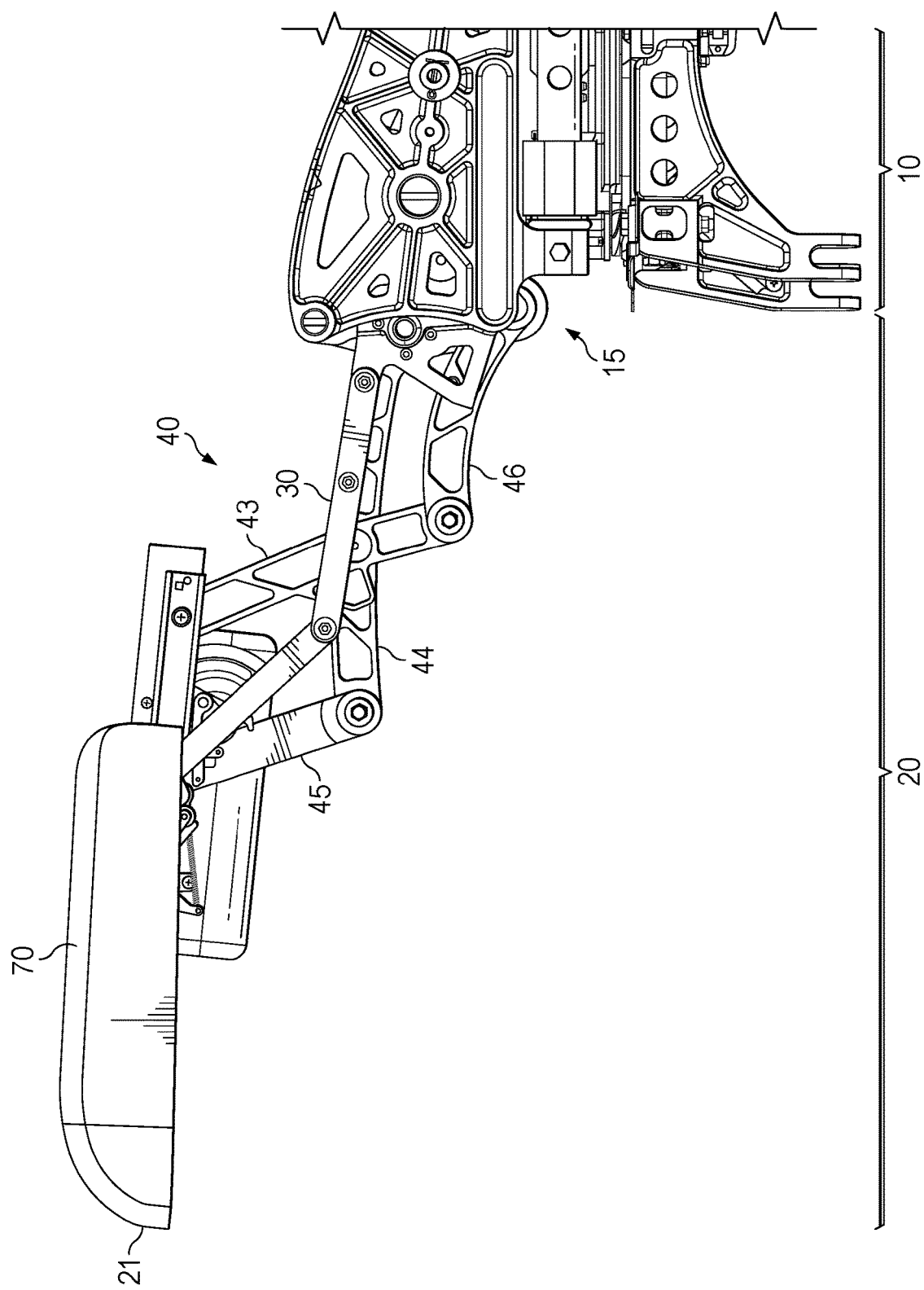
FIGS. 1A and 1B show a seat with an extendable leg rest in a deployed position and a stowed position according to embodiments.
Figure 1B:
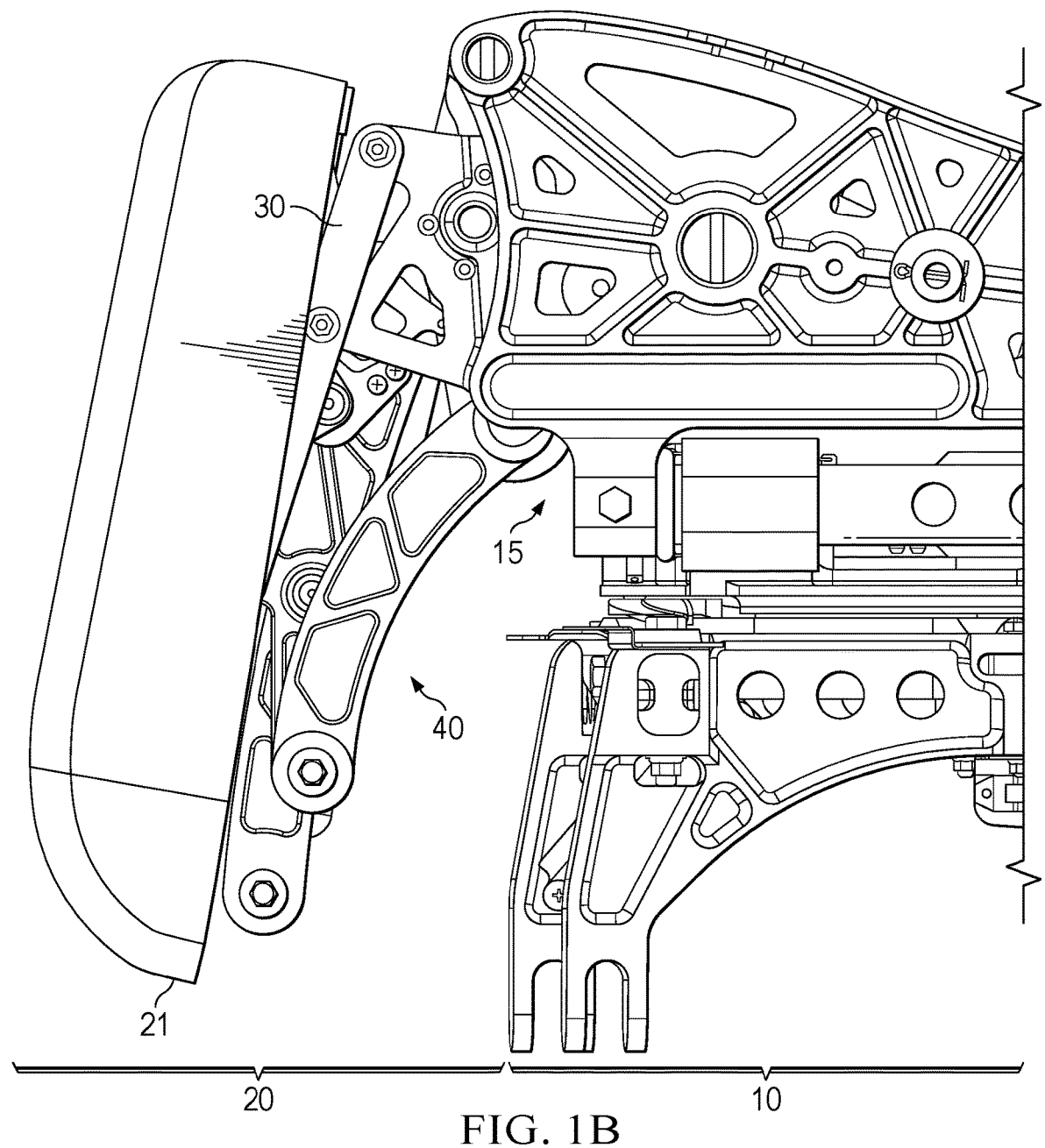

FIGS. 1A-1B show an airplane or aircraft seat 10 with an extendable leg rest 20. The motorized leg rest 20 is connected to the airplane seat via stowage linkage 30 and a deployment and stowage mechanism 40. FIG. 1A shows the leg rest 20 in its deployed position and FIG. 1B shows it in its stowed position. The stowage linkage 30 locks the leg rest 20 in its stowed position, i.e., prevents the leg rest 20 from moving when it is fully stowed. The seat 10 may include the gearbox/motor 15 for deploying or retracting the leg rest 20.

The gearbox/motor 15 comprises an electric motor. The gearbox/motor 15 provides power to a plurality of linkages of the deployment and stowage mechanism 40 so that the linkages move the leg rest 20 in a rotational and non-linear process and so that the front edge 21 of the leg rest 20 does not contact the cabin floor of the airplane. The linkages translate the force/torque of the rotation of the gearbox/motor 15 into a rotational and predominantly horizontal movement. The amount of torque on the system is directly dependent on the extension of the leg rest 20. The farther the leg rest 20 extends, the greater the torque the system experiences. The mechanical movement of the linkages together with the extension and retraction mechanism 100 (see below) is responsible that the leg rest 20 does not contact the cabin floor. In various embodiments the motor 15 may be the only motor that provides power to the deployment and the stowage (mechanism 40) of the leg rest 20. The extension and retraction mechanism 100, and in particular the retraction mechanism 90 may be operated only by the deployment and stowage mechanism 40 without the assistance of any other motor or force. The deployment process and the retraction or stowage process performed by the deployment and stowage mechanism 40 may be processes that mirror each other, e.g., reach the same end positions and move at the same rate.

The deployment and retraction linkages 43-46 are now described. Linkage 44 connects at one end to linkage 45, in a middle part to linkage 43 and at the other end to the gearbox/motor 15. Linkage 43 connects at one end to base plate 42, in a middle part to linkage 44 and at the other end to linkage 46. Linkage 45 connects at one end to the base plate 42 and the retraction mechanism 90 and to linkage 44 at the other end. Linkage 46 connects at one end to linkage 43 and at the other end to the gearbox/motor 15. Unlike the linkage 44, linkage 46 is not driven or powered by the gearbox/motor 15 but rather only secured to it. In various embodiments, linkage 46 acts to prevent linkage 44 from rotating freely.

Figure 2A:
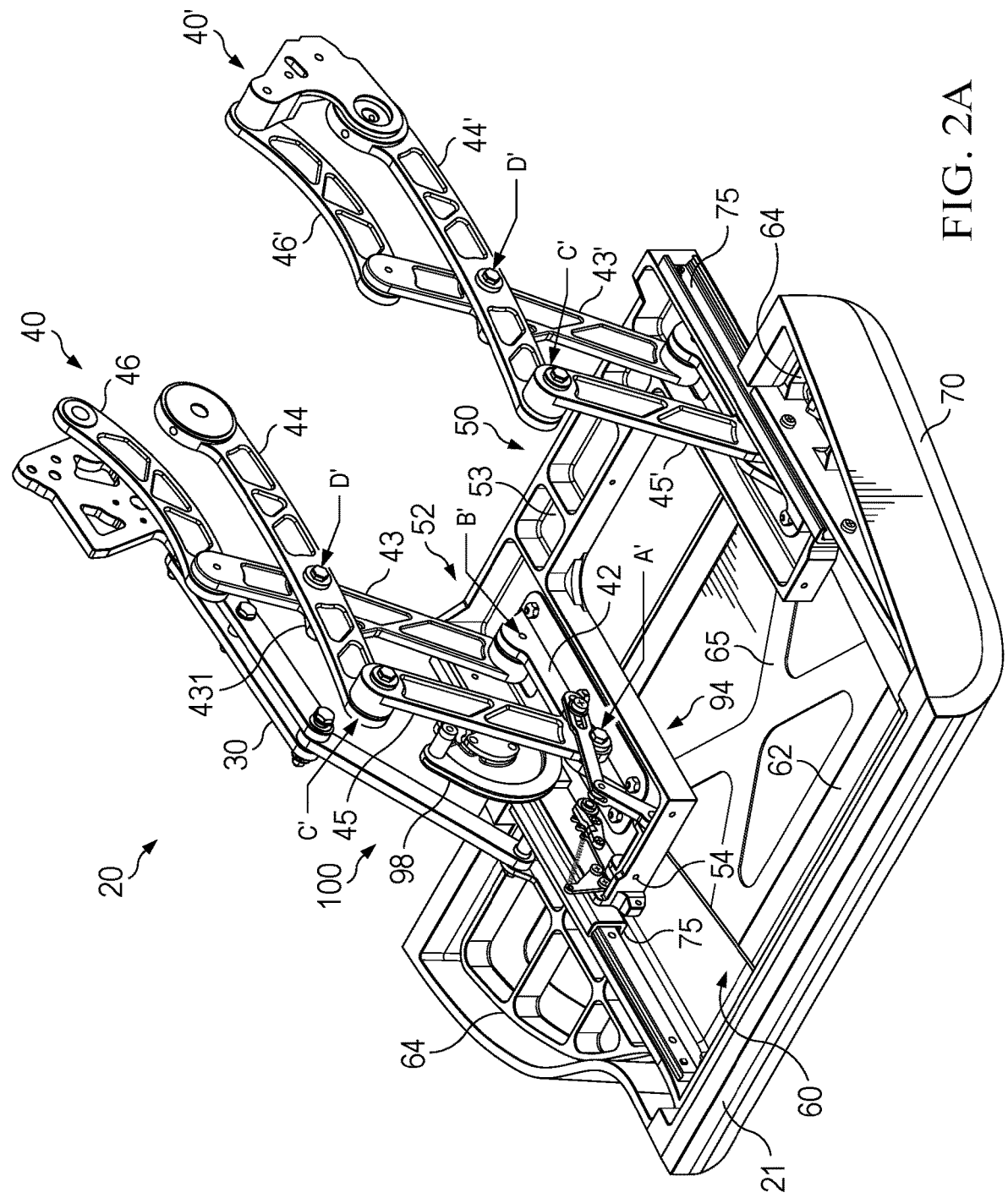
FIGS. 2A-2C show a leg rest in different views in its extended position according to embodiments.
Figure 2B:
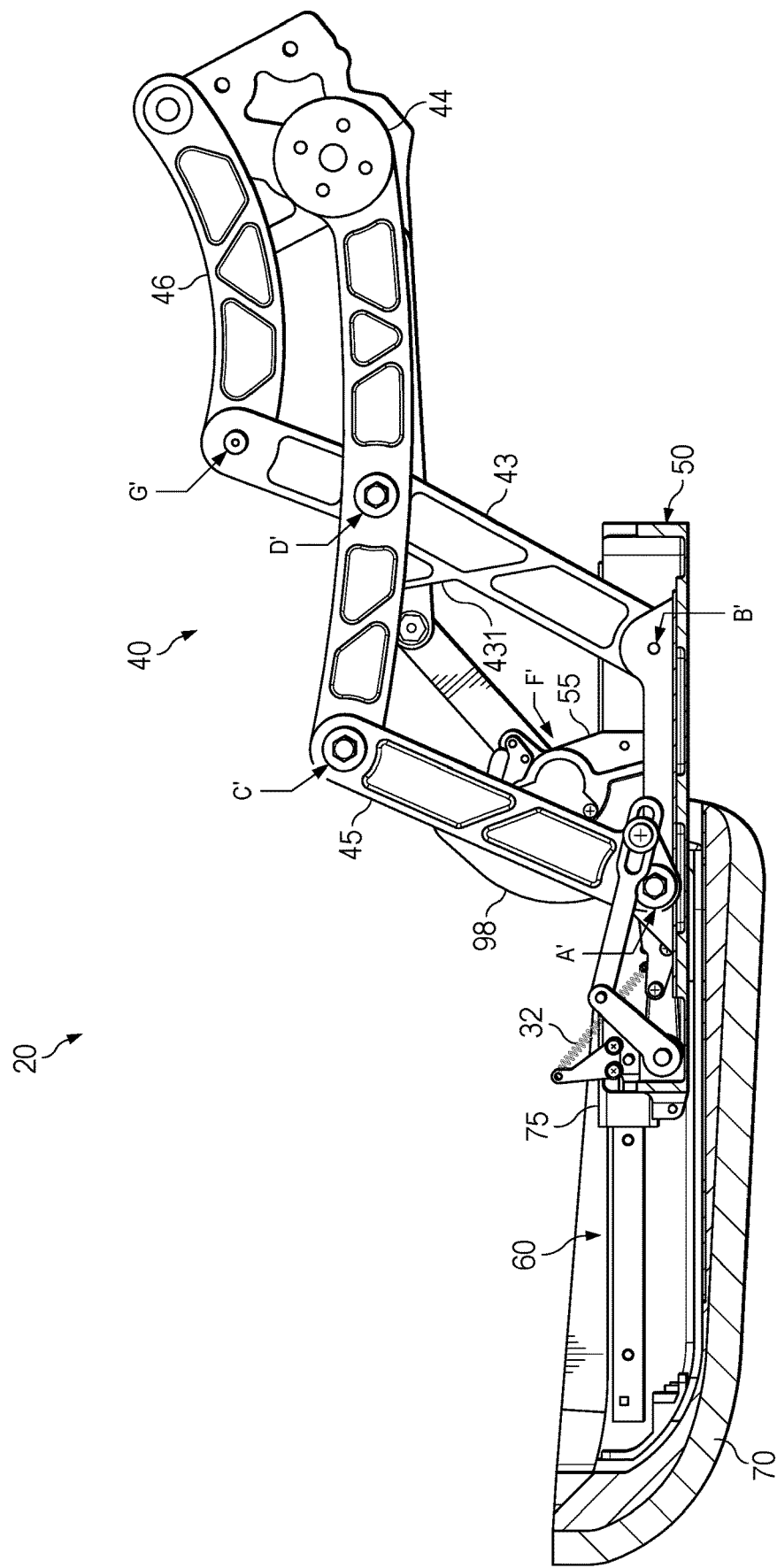
Figure 2C:
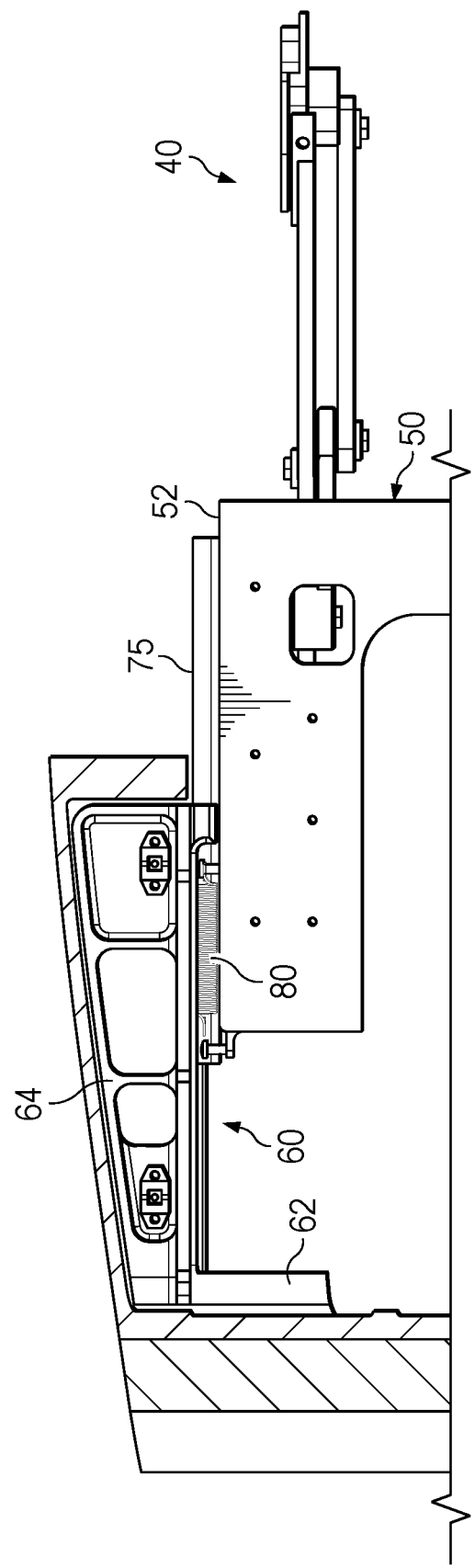

FIGS. 2A-2C show the extendable leg rest 20 fully deployed in a bottom perspective view, in a side view and in a (partial) top view. The leg rest 20 includes the deployment and stowage mechanism 40 mounted and connected to a leg rest mounting fixture 50. The leg rest 20 further comprises a leg rest extension frame 60, movably connected to the mounting fixture 50, a leg rest pad 70 fixedly connected to the extension frame 60 and the extension and retraction mechanism 100 translating the movement of the deployment and stowage mechanism 40 into a movement of the extension frame 60 moving towards or away from the mounting fixture 50.

When the leg rest 20 is moved from the stowed position to the deployed position, the mounting fixture 50 is moved relative to the seat 10 via the deployment and stowage mechanism 40 and, at the same time, the extension frame 60 is moved, at one point of the extension process, relative to the mounting fixture 50 via the extension and retraction mechanism 100. The deployment and stowage mechanism 40 (the linkages 43-46) may be the only part that provides power for deploying and retracting the leg rest 20, or the only part that provides power for shortening the position between the extension frame 60 and the mounting fixture 50. In various embodiments, the leg rest 20 is essentially always placed in the same place when stowed or deployed.

The mounting fixture 50 is a rigid structure that allows stable deployment and stowage of the leg rest 20. In various embodiments the mounting fixture 50 functions as a reference point with respect to the other parts of the leg rest 20. The forces associated with the motion of the extension frame 60 and/or leg rest pad 70 are described with respect to the fixture 50.

The extendable leg rest 20 may comprise one deployment and stowage mechanism 40, two deployment and stowage mechanisms 40 or even more than two of such mechanisms 40. Further, each deployment and stowage mechanisms 40 may comprise a plurality of linkages such as three, four or more linkages. Moreover, the extendable leg rest 20 may comprise one stowage linkage 30, two stowage linkages 30 or even more than two such linkages 30. In various embodiments the leg rest 20 comprises four linkages 43-46 but only one extension and retraction mechanism (with two extension mechanisms 75 and one retraction mechanism 80) 100.

Referring again to FIG. 2A, the leg rest mounting fixture 50 may be shaped as a U although other shapes are possible. The mounting fixture 50 comprises a frame plate 52. The frame plate 52 may be flat on the top side and may comprise a frame structure 53 at the bottom side. The frame structure may include cross beams or a comb structure. The mounting fixture 50 may have a symmetrical or an asymmetrical U shape. For example, an asymmetrical mounting fixture 50 may be used when one deployment and stowage mechanism 40 and/or extension and retraction mechanism 100 is used while a symmetrical mounting fixture 50 may be used when two deployment and stowage mechanisms 40 and/or extension and retraction mechanism 100 are used. The mounting fixture 50 may be made from metal such as aluminum. In various embodiments, the mounting fixture 50 is covered (wrapped) or partially covered (wrapped) in leather since it is partially visible. The long legs of the U of the frame plate 52 may have same length.

The deployment and stowage mechanism 40 is mounted to a bottom side of the frame plate 52 of the mounting fixture 50. The deployment and stowage mechanism 40 includes a base plate 42 and deployment and retraction linkages 43-46. The linkages 43-46 may be levers such as metal levers (e.g., from aluminum). The linkage 43 may be connected to the base plate 42 at pivot point B' and may be rotatably movable relative to the base plate 42 about axis B, e.g., pivotable about axis B. The linkage 43 is connected to the base plate 42 by mechanical fasteners, e.g., a flange bushing secured with a bolt and thrust washer. The linkage 45 may be connected to the base plate 42 at pivot point A' and is rotatably movable relative to the base plate 42 about axis A, e.g., pivotable about axis A. The linkage 45 is connected to the base plate 42 by mechanical fasteners, e.g., a flange bushing secured with a bolt and thrust washer. The linkage 45 may be connected to the linkage 44 at pivot point C' so that the two linkages 44, 45 are able to rotatably move relative to each other about axis C and along a longitudinal direction relative to each other. The linkages 44 and 45 are connected by mechanical fasteners, e.g., a flange bushing secured with a bolt and thrust washer. The linkage 43 may be connected to the linkage 44 at pivot point D' so that the two linkages 43, 44 are able to move relative to each other about axis D and along a longitudinal direction relative to each other. The linkages 43 and 44 are connected by mechanical fasteners, e.g., a flange bushing secured with a bolt and thrust washer. The linkage 43 may be connected to the linkage 46 at pivot point G' so that the two linkages 43, 46 are able to move relative to each other about the G axis and along a longitudinal direction relative to each other. Linkage 43 and 46 are connected by mechanical fasteners, e.g., a flange bushing secured with a bolt and thrust washer. The connections between the linkages 43-46 and the base plate 42 may all be the same. Alternatively, the connections may all be different. In an embodiment linkages 44-46 are connected to their respective other linkage 44-45 near their end points, while each linkage 43-44 is also connected to the respective other linkage 43-44 near the middle of their linkages.

The linkages 43-46 at their respective pivotal points A', B', C' D' and G' (A'=linkage 45 and base plate 42, B'=linkage 43 and base plate 42, C'=linkage 45 and linkage 44, D'=linkage 43 and linkage 44, and G'=linage 43 and linkage 46), may be connected to the respective connection points via screws, washers (including thrust washers) and nuts, via flange bushings, nuts or screws, and washers (including thrust washers), or via other connection means holding the linkages together.

The extension frame 60 may also be U shaped although other shapes are possible. The extension frame 60 comprises a frame plate 62. The frame plate 62 may be flat at the top side and may have a frame structure at the bottom side. The long legs of the frame plate 62 may have the same lengths. A comb structure 64 may extend from an outer side of each long leg of the U shaped frame plate 62. The two comb structures 64 may have the same or different structures and dimensions. The extension frame 60 is made from metal such as aluminum.

The open side of the U of the frame plate 62 of the frame 60 may face the open side of the U of the frame plate 52 of the mounting fixture 50. Inner sides of the long legs of the U of the frame plate 62 may be arranged vis-a-vis outer sides of the long legs of the frame plate 52 of the mounting fixture 50. In various embodiments, the long legs of the U of the frame plate 52 and the long legs of the U of the frame plate 62 have the same lengths.

The U shape structures of both, fixture 50 and frame 60, have the advantage that they reduce the likelihood that anything is getting stuck between the moving and static parts of the leg rest 20.

The leg rest pad 70 is fixedly connected to the mounting frame 60. For example, the pad 70 may be mounted to a top side of the frame plate 62 of the mounting frame 60 with 4 ball catchers to allow easy removal of the pad 70 from the mounting frame 60. The leg rest pad 70 may completely cover the mounting frame 60 in top view when installed. The pad 70 comprises a cushion on which the passenger can place his or her leg. The pad 70 may be foam in a plastic enclosure and, e.g., covered in leather. The pad 70 may use the mounting frame 60 as additional structural support 65 to prevent flexing of the cushion.

The extension frame 60 is movably mounted to the mounting fixture 50 by an extension and retraction mechanism 100. The extension and retraction mechanism 100 comprises an extension mechanism 80 and a retraction mechanism 90. The two mechanisms may be independent and distinct from each other, meaning, the extension mechanism 80 may provide a force and the retraction mechanism 90 may provide an independent (opposite or counter) force.

FIG. 2C shows a connector 75 and the extension mechanism 80 sandwiched between the mounting fixture 50 and the extension frame 60. The connector 75 may guide the extension frame 60 with respect to the mounting fixture 50. The connector 75 might be placed between an outer side of a long leg of the frame plate 52 of the mounting fixture 50 and the inner side of the long leg of the fame plate 62 of the extension frame 60. In various embodiments there are two connectors 75, each between one long leg of the frame plates 52, 62 (see also FIG. 2A). In some embodiments the connector 75 is not an individual stand-alone element but integrated either in the leg rest mounting fixture 50 or the leg rest extension frame 60. The connector 75 may be a telescope rail. Alternatively, the connector 75 may be a rail and carriage system. The connector 75 might be made from a metal such as aluminum.

The extension mechanism 80 may be placed below or above the connector 75. The extension mechanism 80 is configured to provide a force to move the extension frame 60 away from the mounting fixture 50. The extension mechanism 80 may provide a permanent force or alternatively, a force which is selectively enabled. For example, the extension mechanism 80 is a spring above or below the telescope rail 75. One end of the spring may be connected to the frame plate 52 of the mounting fixture 50 and the other end of the spring may be connected to the frame plate 62 of the extension frame 60. As previously indicated, there may be two such extension mechanisms (springs) 75, each between respective long legs of the Us of the fixture 50 and the frame 60. In alternative embodiments, the extension mechanism 80 might be placed inside connector 75.

The extension mechanism 80, e.g., a spring, may move the mounting frame 60 (and the pad 70) away from the fixture 50, from a proximal position to a distal position. The maximal extension may be between about 3 inches (about 8 cm) to about 6 inches (about 15 cm). Alternatively, the maximal extension may be between about 4 inches (about 10 cm) to about 5 inches (about 13 cm). Because of this, the leg rest pad 70 may extend so that a user's (passenger's) leg interacts with the pad 70 further down the calf which provides a more comfortable user experience. Moreover, by extending the point of contact with the calf closer to the foot, an unseating force of the passenger is reduced and the passenger can rest more comfortably. An unseating force can be defined as an imbalance of toque by which the force created by weight associated to the center of gravity (CG) of the foot is multiplied by the distance to the calf-leg rest pad contact/pivot point which acts to pull the passenger out of the seat. The magnitude of this force is minimized by decreasing the distance between the foot's CG and the calf-leg rest pad contact point.

Before the retraction mechanism 90 is described in detail, different positions of the linkages 43-46 and the leg rest 20 are described.

Figure 3A:
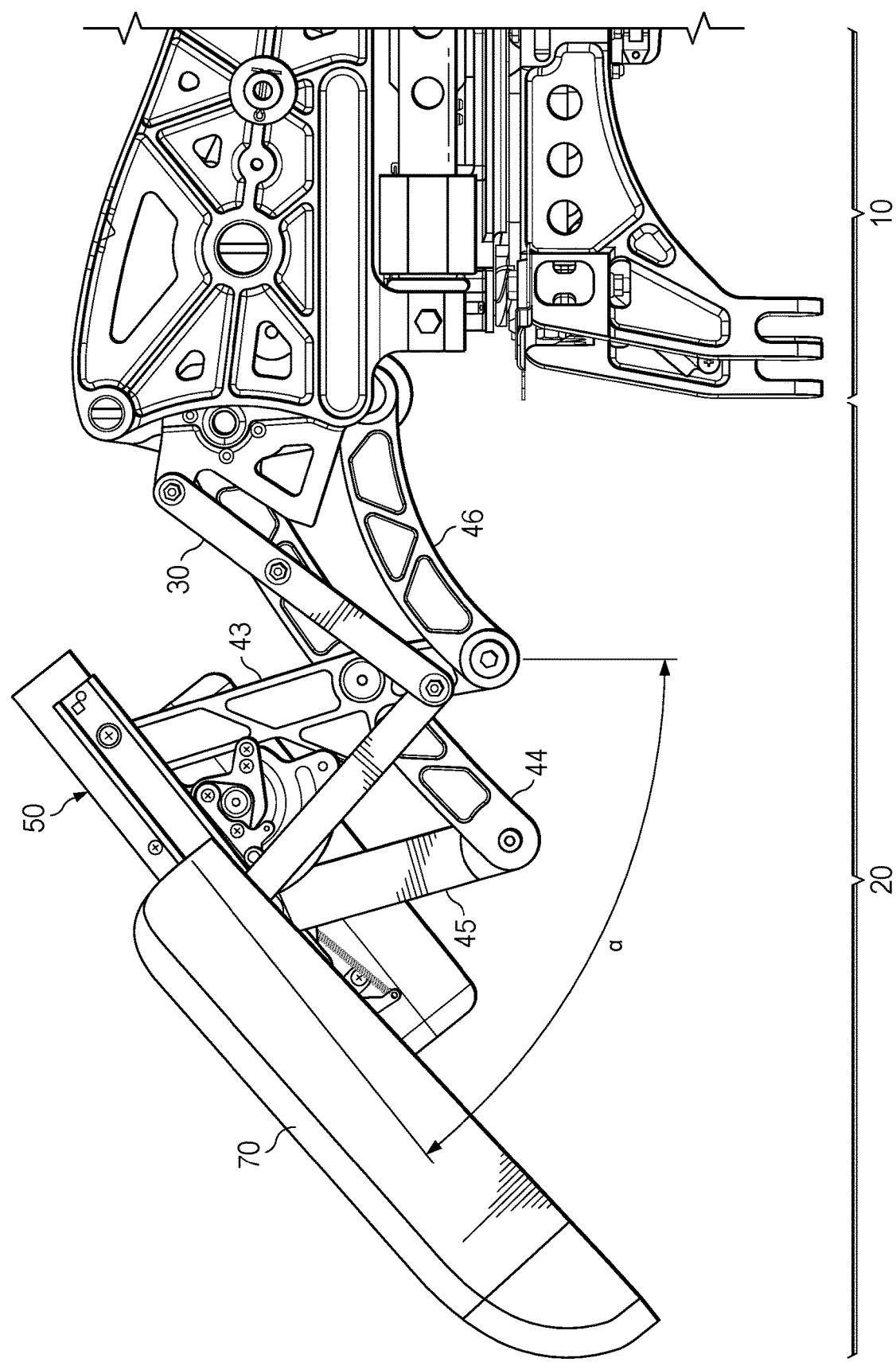
FIG. 3A-3E show the leg rest in different views at a certain deployment angle α according to embodiments.
Figure 3B:
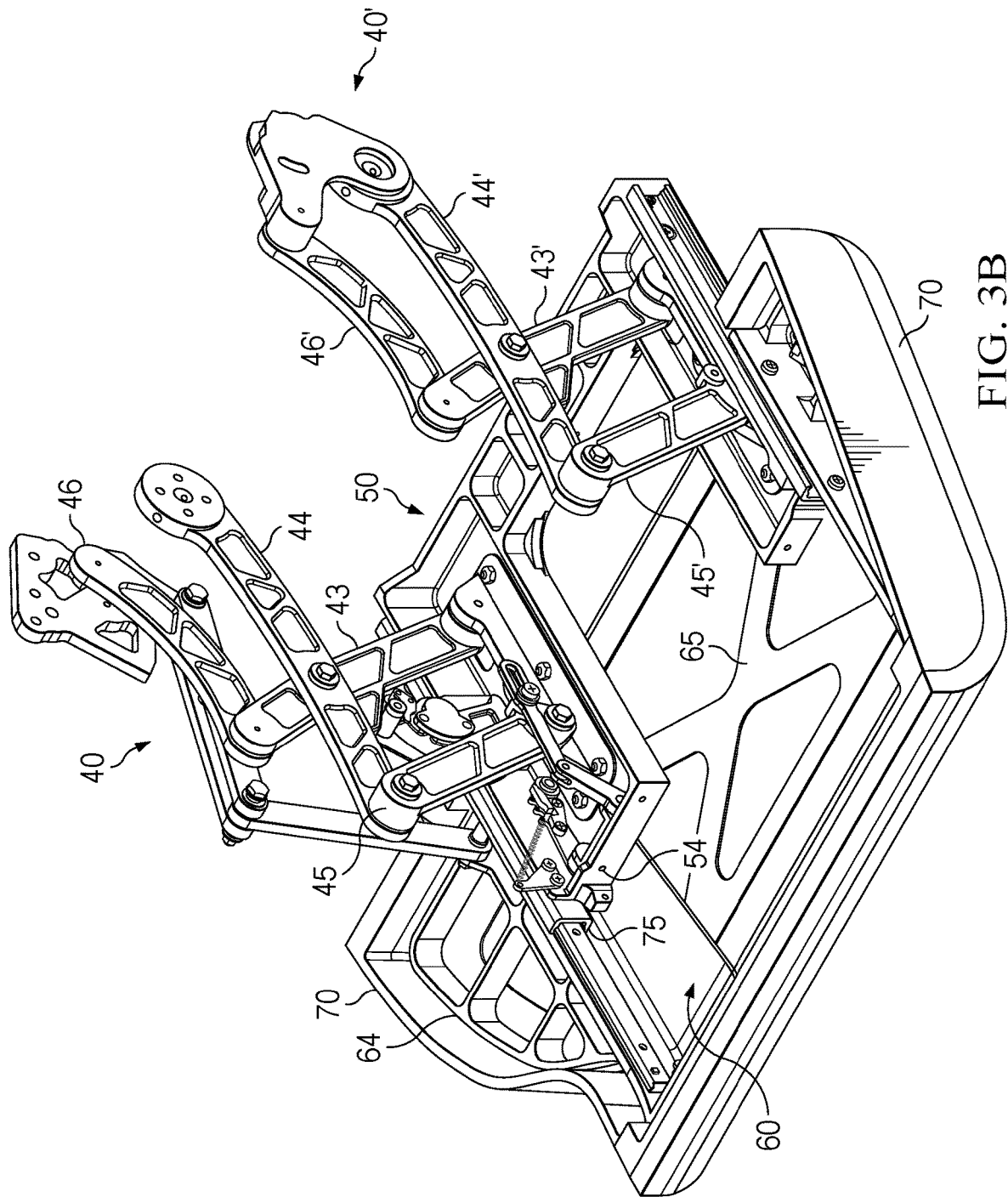
Figure 3C:
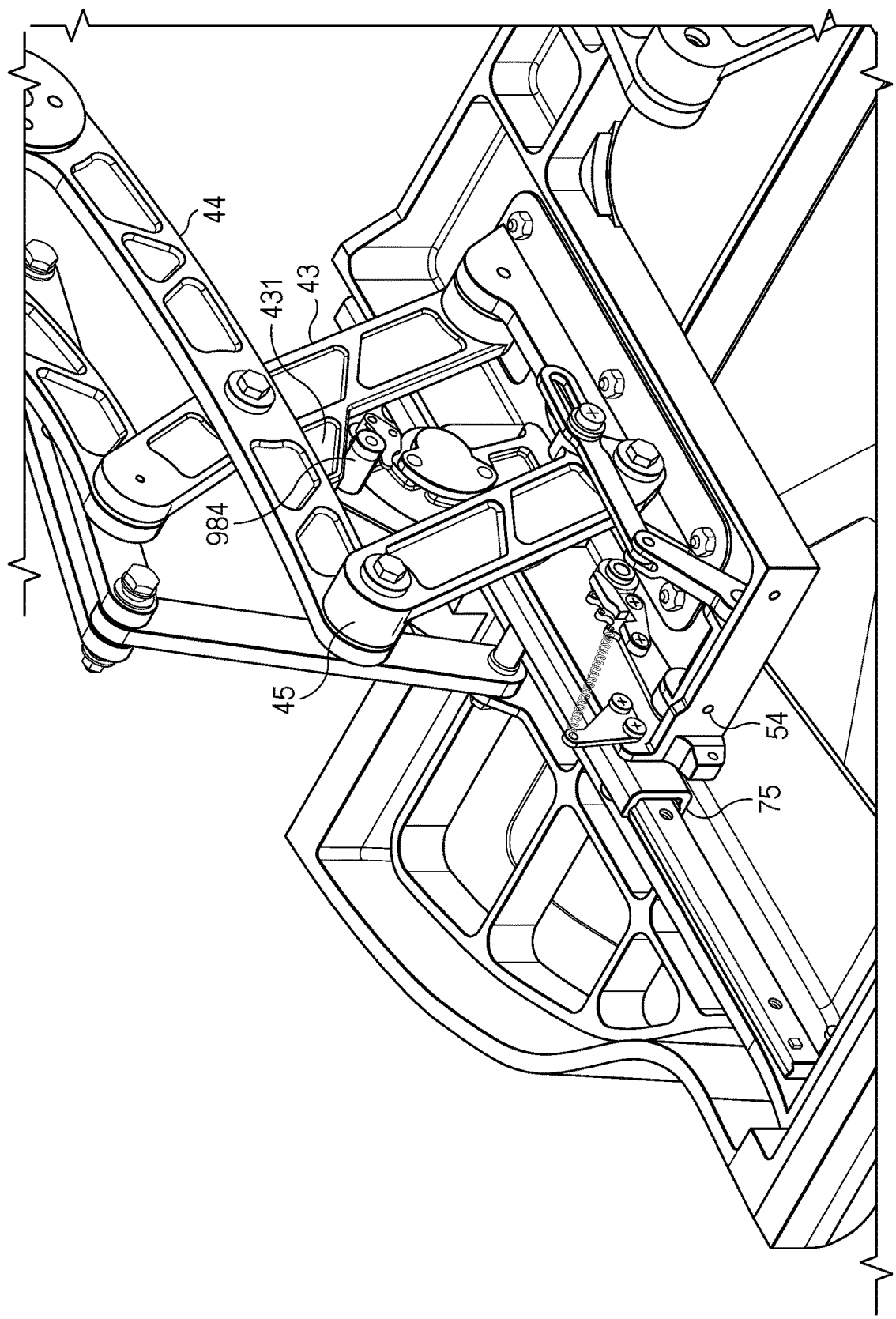
Figure 3D:
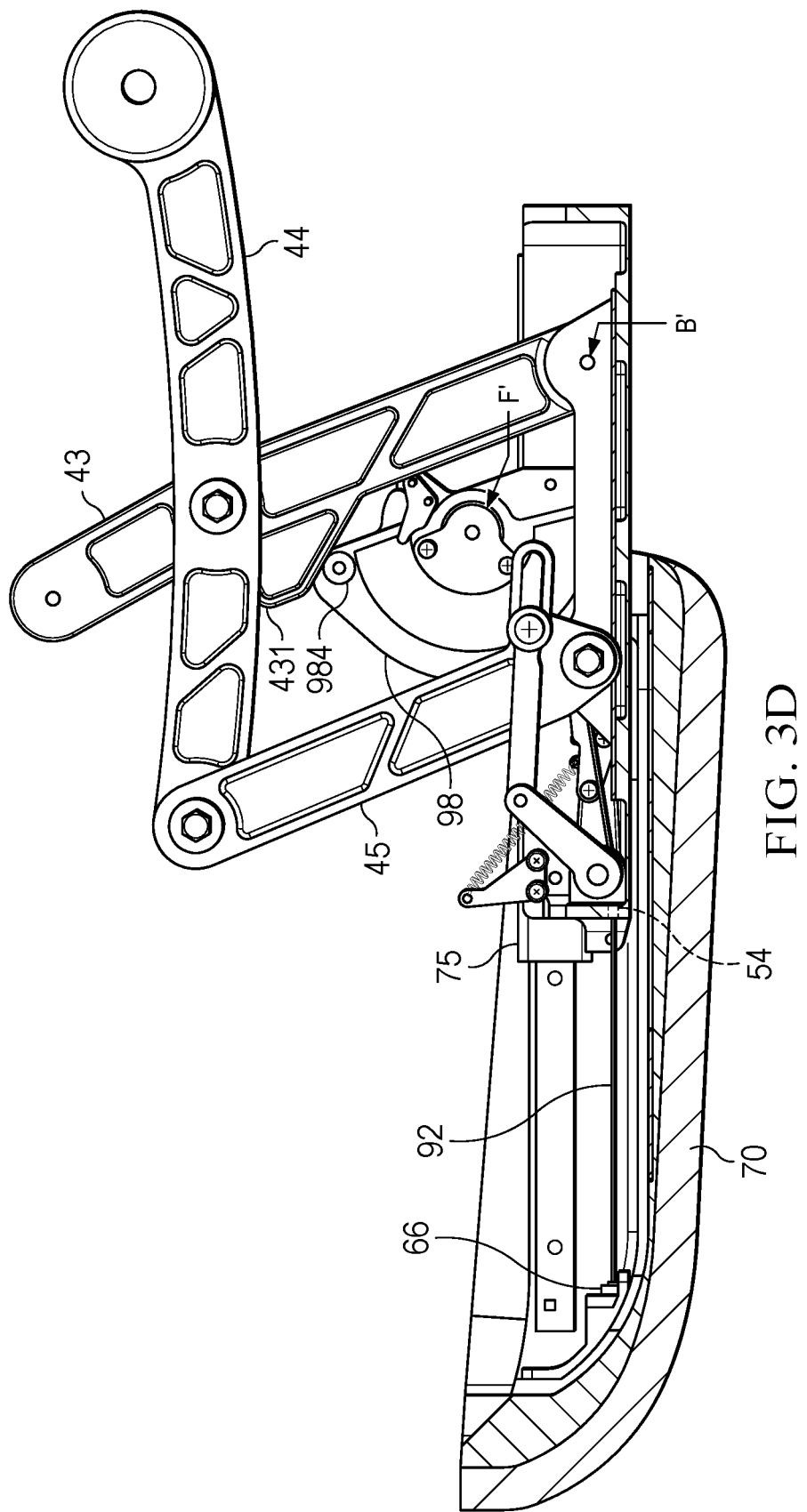
Figure 3E:
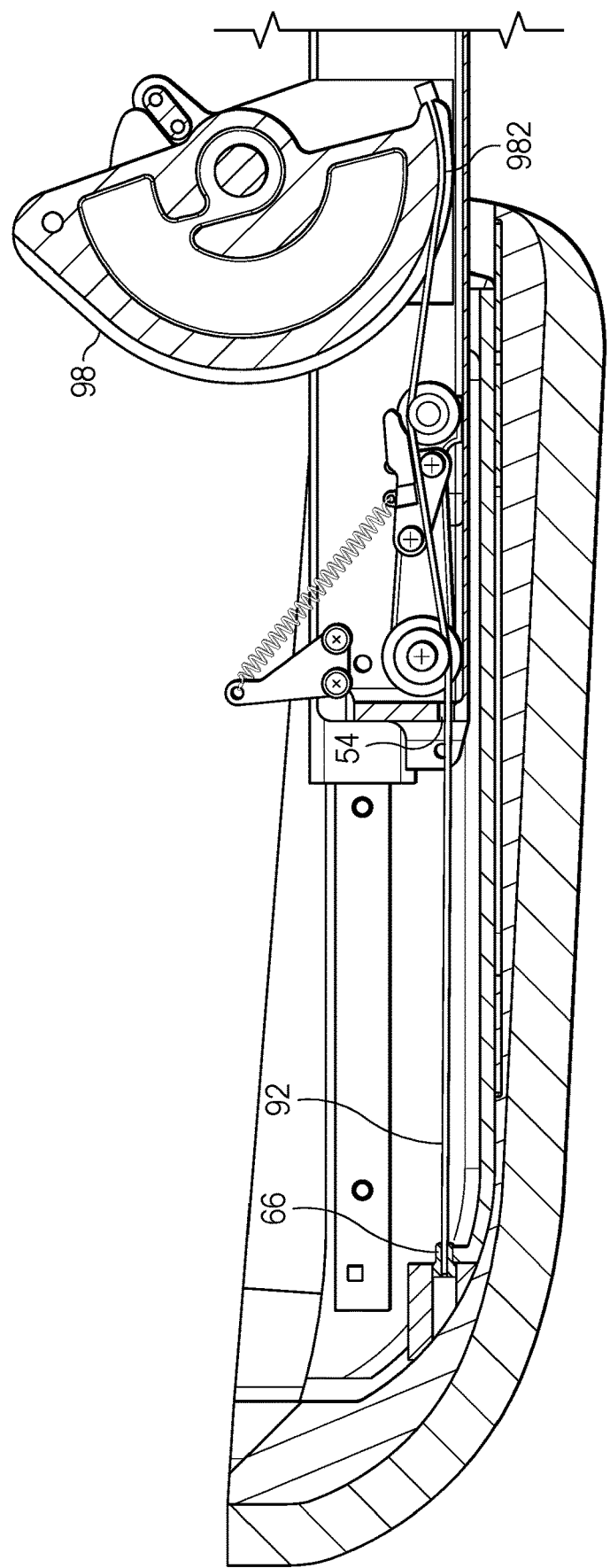

FIG. 3A shows a specific deployment angle $\alpha$ at which the extension frame 60 starts moving against the mounting fixture 50 via the connector or telescoping rail 75 during the extension or retraction process of the leg rest 20. The extension frame 60 is fully extended at this deployment angle $\alpha$ when the leg rest 20 is deployed. Conversely, the extension frame 60 starts to be pulled in relative to the mounting fixture 50 at this deployment angle $\alpha$ when the leg rest 20 is stowed. The deployment angle $\alpha$ may be an angle between 47° and 57° or between 50° and 54° or about 52°. In various embodiments, the extension frame 60 starts moving against the mounting fixture 50 in order to avoid contact of the leg rest pad 70 with the cabin floor. This may be accomplished, as discussed later, by a linkage of the deployment and stowage mechanism 40 touching and moving the retraction cam 98 of the extension and retraction mechanism 100. FIG. 3B shows the position of FIG. 3A in a bottom perspective view, FIG. 3C is a detailed view of FIG. 3B, FIG. 3D is a side view and FIG. 3E is a cross section to demonstrate the retraction mechanism 100 of that side view. Some linkages of the deployment and stowage mechanism 40 are hidden for clarity in FIGS. 3C-3E.

Figure 4A:
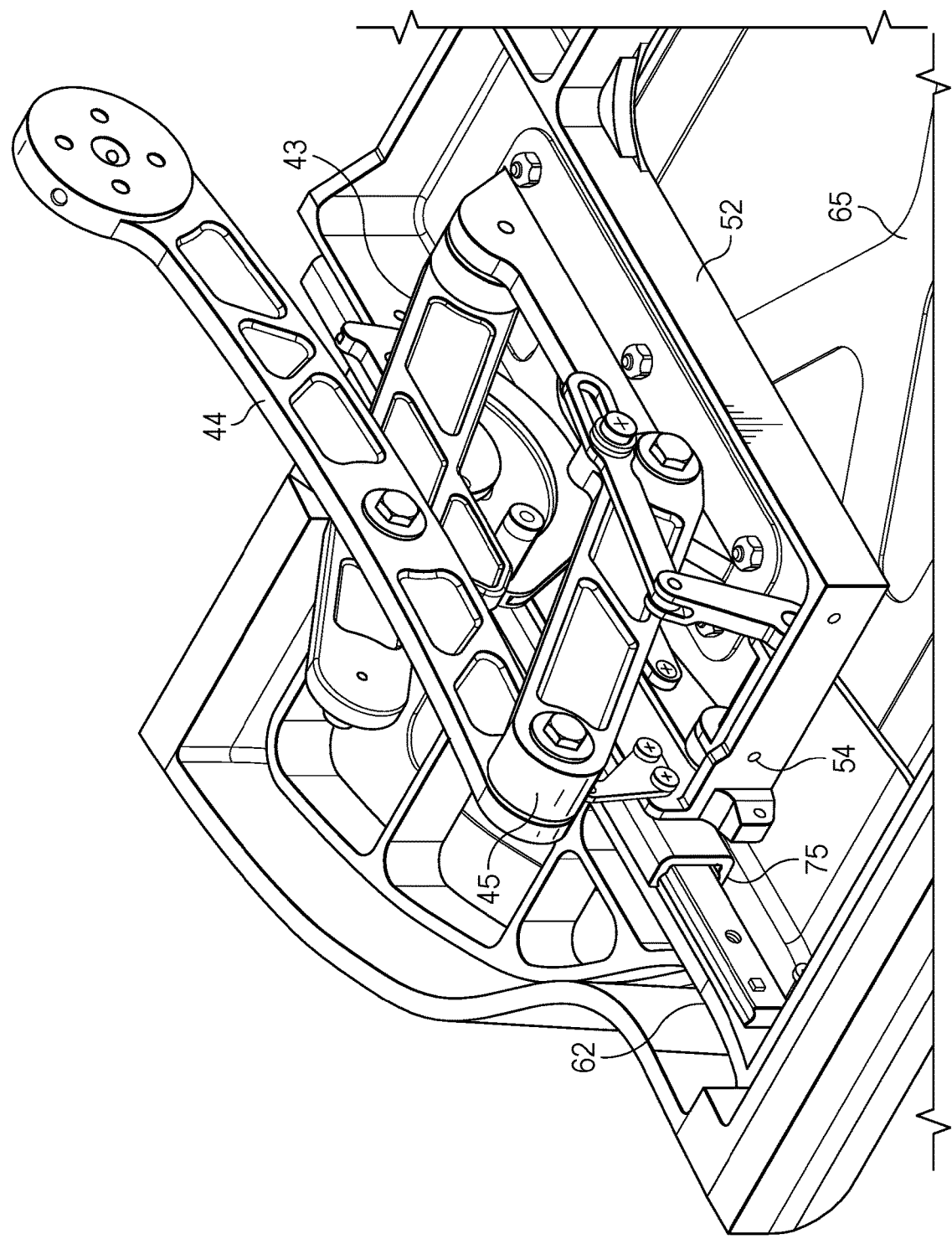
FIGS. 4A and 4B show the leg rest in different views midway through the extension or retraction process according to embodiments.
Figure 4B:
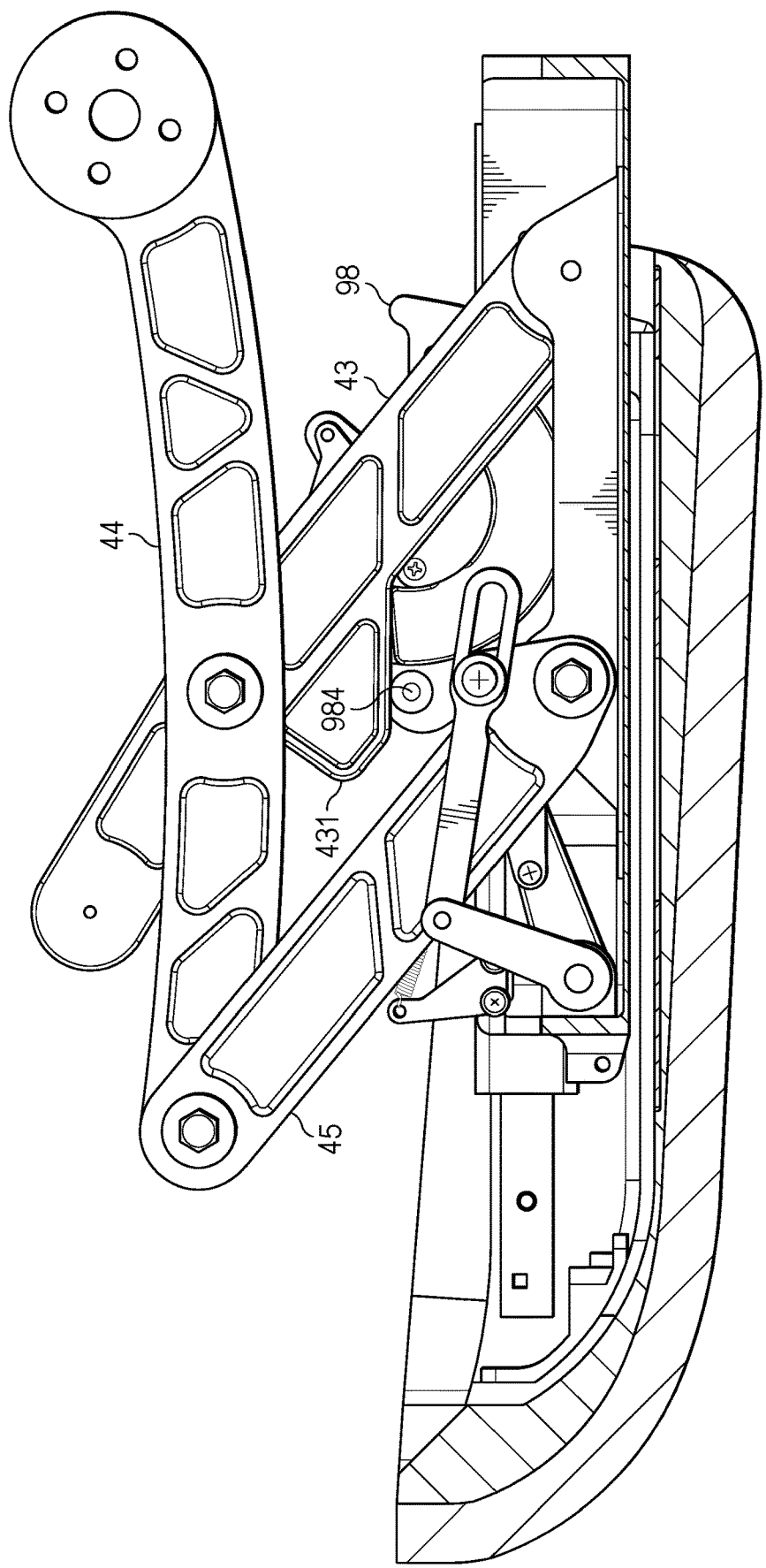
Figure 5A:
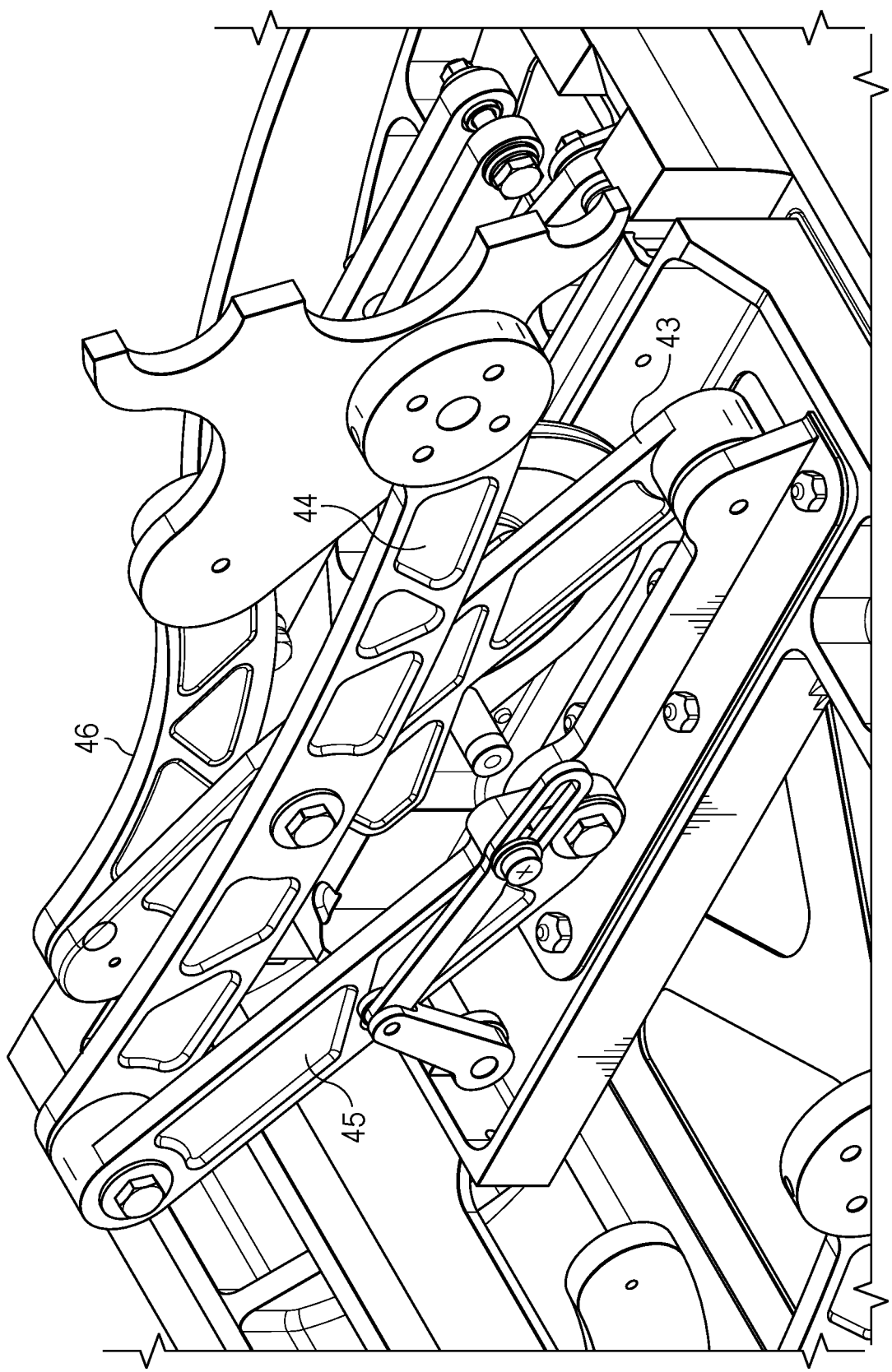
FIGS. 5A and 5B show the leg rest in different views in a fully retracted position according to embodiments.
Figure 5B:
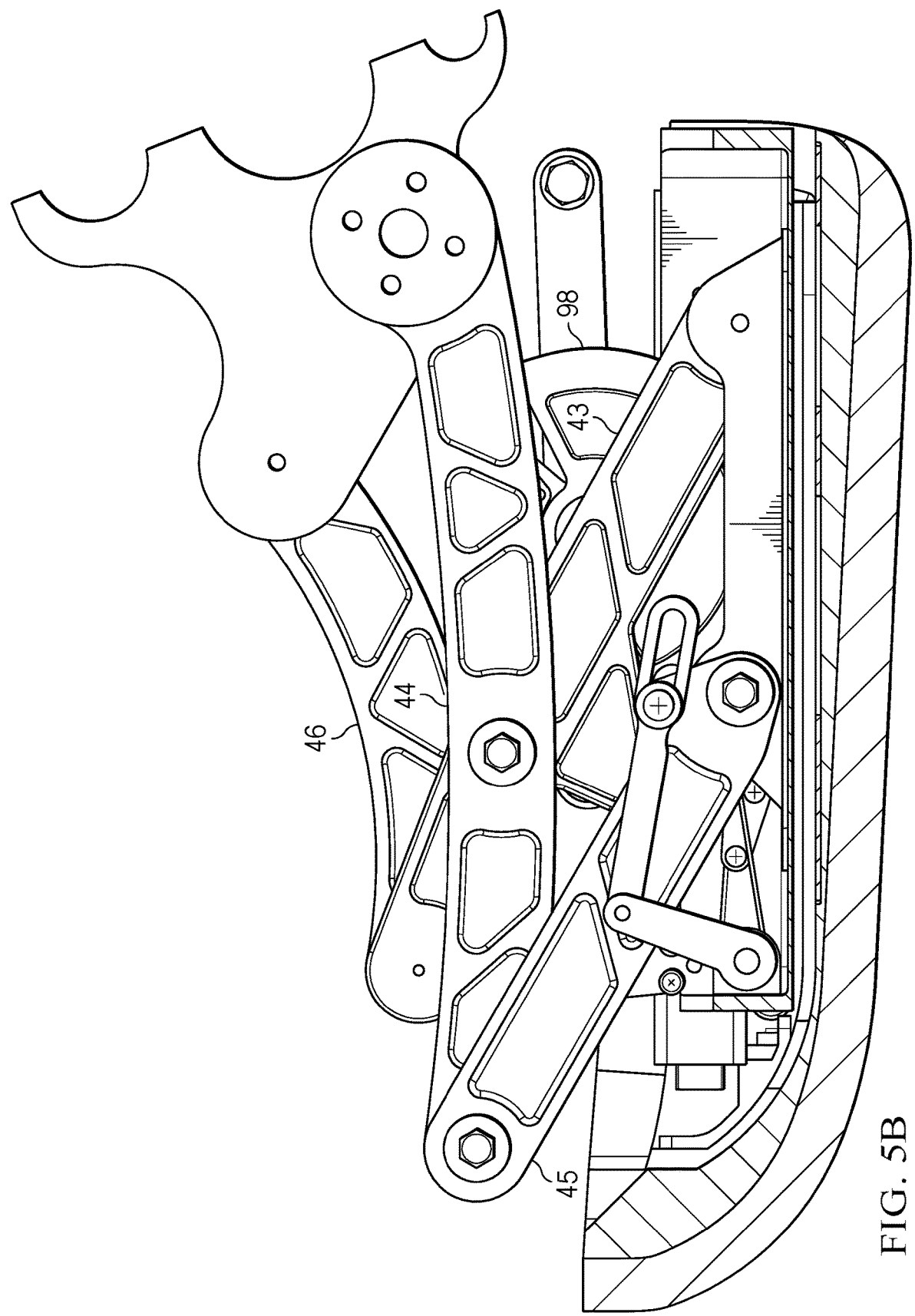

FIG. 4A-4B show the configuration about midway through the deployment or retraction process of the leg rest 20. FIG. 4A shows a detail of a bottom perspective view and FIG. 4B shows a cross sectional side view of that position. FIG. 5A-5B show the fully retracted leg rest 20. FIG. 5A shows a detail of the bottom perspective review and FIG. 5B shows a cross sectional side view of this position. Each view shows a different position of the leg rest 20 and the linkages 43-45/46 with respect to seat 10. Each view also shows the relationship between the linkages 43-45/46 and the extension/retraction mechanism 100 in particular the retraction mechanism 90 pulling the extension frame 60 towards the mounting fixture 50.

Figure 6A:
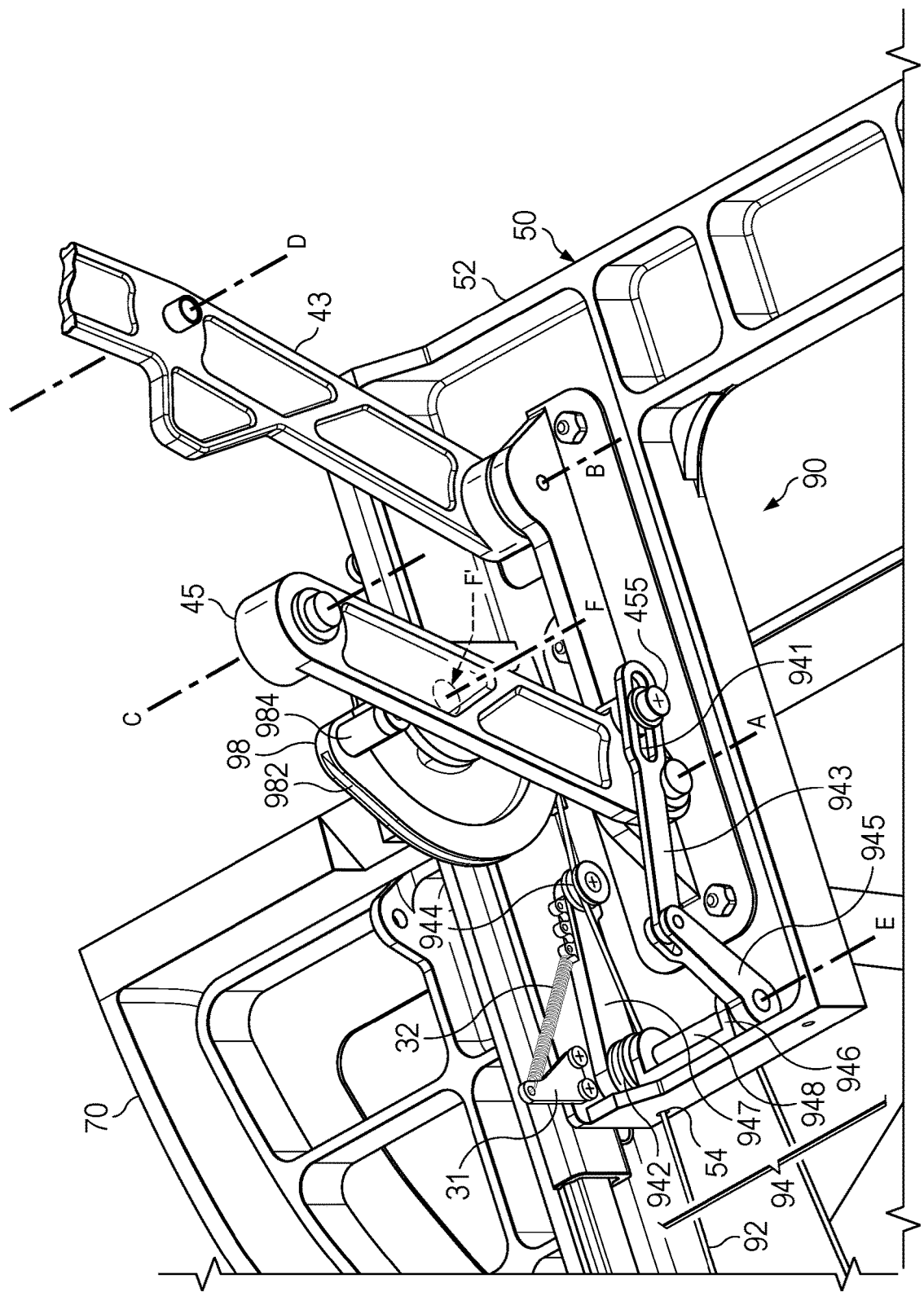
FIGS. 6A and 6B show different views of the retraction mechanism.
Figure 6B:
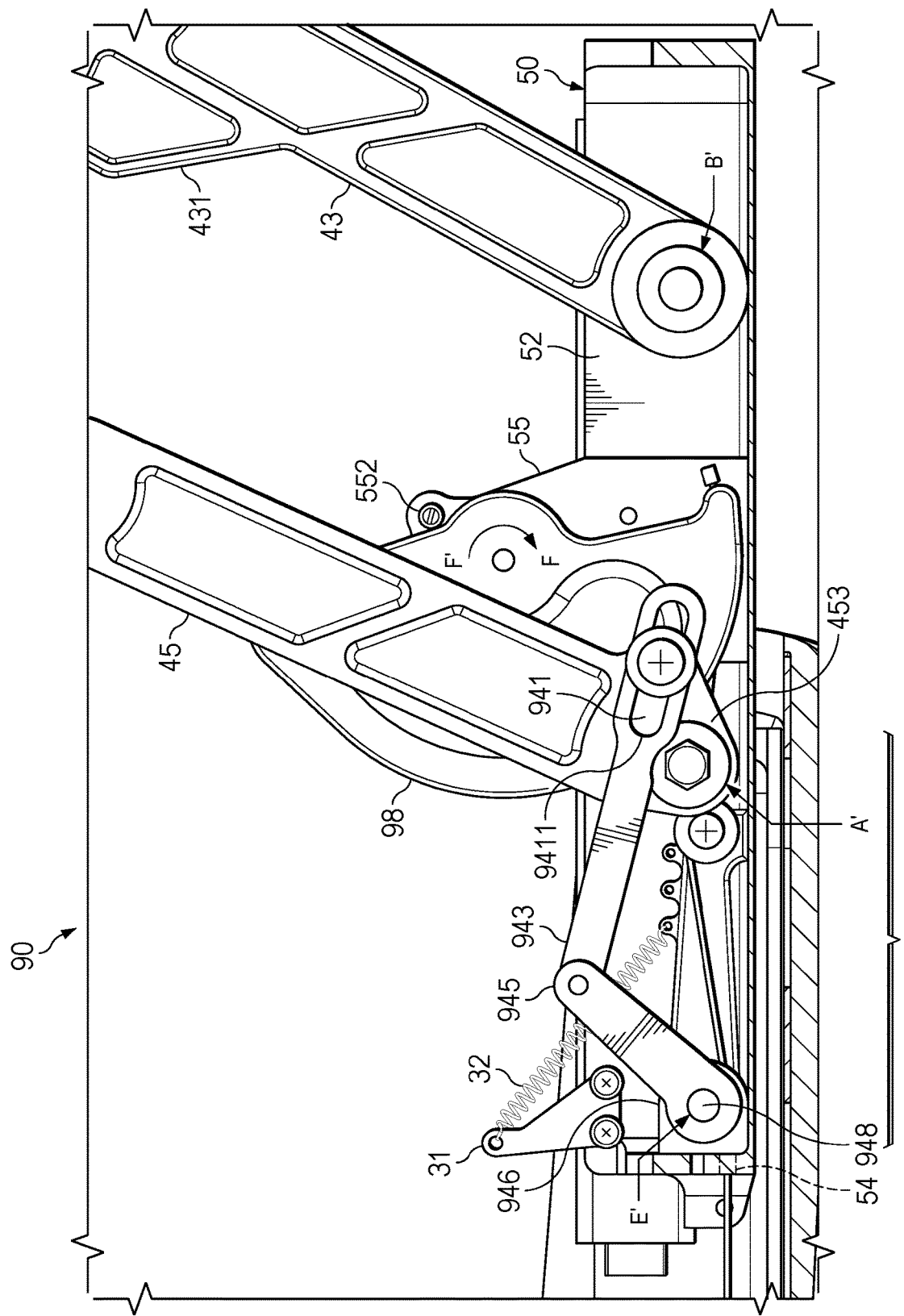

FIG. 6A-6B show a detail of the retraction mechanism 90. Here, as with respect to some of the earlier Figures, linkages of the deployment and stowage mechanism 40 are hidden for clarity in Figures. The retraction mechanism 90 comprises a retraction cable 92, a cable tensioner system 94 and a retraction cam or a bell crank 98. The retraction mechanism 90 is configured to move the extension frame 60 towards the mounting fixture 50, or to pull or reel in the extension frame 60.

The cam 98, which could be a bell crank cable sheave, is arranged at pivot point F' at a rotation cam mounting plate 55, which could be an extension of the frame plate 52 or an extension that is fixed to the frame plate 52 (see, e.g., FIG. 6B). The cam mounting plate 55 may be attached to the frame plate 52 with 2, 4 or more countersunk screws. The plate 55 may be arranged at the frame plate 52 with other means such as riveted bolts or rivets. The cam mounting plate 55 may be arranged at an outer side of one of the long legs of the U of the frame plate 52 if one retraction mechanism 90 is employed. Alternatively, two mounting plates 55 may be arranged at the frame plate 52, each at an outer side of one of the long legs of the U of the frame plate 52.

The cam 98 may be attached to the rotation cam mounting plate 55 via a shoulder bolt with a thrust washer and flange bushing to reduce friction. The cam 98 is able to pivot about an axis F that is shifted with respect to axis B about which linkage 43 is able to pivot. As the motor/gearbox 15 pulls in the leg rest 20 via linkages 43-46, linkage 43 will eventually touch the cam stud (e.g., roller ball bearings) 984 and therefore moves or rotates cam 98 about axis F. The cam 98 interacts with linkage 43 through the non-linear surface 431/roller bearing 984 so that the cam 98 rotates at varying speeds depending on the angular deployment a of the leg rest 20. In particular, when the cam stud 984 moves along the non-linear surface 431 of linkage 43, the cam stud's (e.g., roller ball bearings') 984 position relative to pivot points B' and F' changes (see, e.g., FIGS. 3B-3D and 4A-4B). The design of the non-linear surface 431 (or nose) has an effect on the relative rotational acceleration and the rotational speed of the cam 98. The arrangement of the cam 98 at the rotation cam mounting plate 55 and the design of the nose 431 of the linkage 43 allow for a large radius of the cam 98 and an adjustable rotational speed.

The rotation of retraction cam 98 is limited by a hard limit 552 (see, e.g., FIGS. 6B). The hard limit 552 may be a headless shoulder bolt secured to the mounting plate 55. Alternatively, the hard limit 552 could be arranged at the cam 98. The limit 552 prevents the cam 98 from over-rotating thereby creating slack in the cable 92. The limit 552 also allows to define a zero-position that sets the deployment angle α at which the frame 60 starts to retract or extend. After the leg rest 20 reaches the deployment angle α, in a deployment movement, the cam stud 984 stops contacting the non-linear surface 431 of the linkage 43 and the cam 98 instead rests on hard limit 552. In a reverse process, when the leg rest 20 passes the deployment angle α, the cam stud 984 contacts the non-linear surface 431 and the linkage 43 pulls in the extension frame 60.

The cable 92 may be fixed at/to an anchor point 66 at the bottom surface of frame plate 62 of the extension frame 60 (see, e.g., FIGS. 2A-2C, 3D-3E and 6A-6B). The cable 92 may be guided through a hole 54 in one of the front sides of the U of frame plate 52 of the mounting fixture 50, under a first pulley 942 at the cable tensioner system 94 and over a second pulley 944 at the cable tensioner system 94 to the groove 982 in the retraction cam 98. The cable 92 may be made from metal or other flexible material of similar strength.

FIGS. 6A and 6B show that the cable tensioner system 94 comprises a tensioner system pillow block (also referred to as holder) 946 holding a rotatable tensioner shaft 948, a driven tensioner arm 947, first and second pullies 942, 944, a connect lever 945 and an intermediate tensioner 943 (also referred to as intermediate linkage or intermediate lever). In various embodiments, the tensioner system 94 has two discrete functions: (1) to assist with the extension and retraction of the leg rest 20 through an interface with linkages 43-46 and (2) to keep the cable 92 tensioned in order to prevent it from getting unseated from the pullies 942 and 944. In various further embodiments, the tensioner system 94 is configured to add acceleration to extend or to retract the extension frame 60.

The following paragraphs describe the cable tensioner system 94 in more detail. The rotatable tensioner shaft 948 is held by the tensioner system pillow block 946. The tensioner system pillow block 946 is fixed to the inner side of the front side of the U of the frame plate 52 of the fixture 50. The shaft 948 is rotatable about axis E. The first pulley 942 is arranged on the shaft 948. Moreover, the shaft 948 is connected to tensioner arm 947 at one end and connected to connect lever 945 at the other end. The first pulley 942 is arranged on the shaft 948 between the tensioner arm 947 and the tensioner system pillow block 946.

The shaft 948 may mount to both the connect lever 945 and tensioner arm 947 with coiled spring pins or similar elements. The shaft 948 is secured to and pivots in the tensioner system pillow block 946. Two bearings such as two flanged IGUS bearings may interface between shaft 948 and tensioner system pillow block 946 in order to minimize friction. The tensioner system pillow block 946 is secured to the fixture 50 with, e.g., two, three or more screws.

The tensioner arm 947 is connected to the shaft 948 at one end and to the second pulley 944 on the other end. The second pulley 944 may use a combination of a threaded spacer and a countersunk screw to act as an axle and retaining mechanism. The second pulley 944 is arranged at the tensioner arm 947 such that, when the arm 947 rotates, the cable 92 is pulled or tensioned. The first pulley 942 may adjust the cable 92 so that it exists the mounting fixture 50 (at the hole 54 in the fixture 50) at a constant height. To accomplish this the first pulley 942 is able to rotate on the same axis E as the rotatable tensioner shaft 948 and the tensioner arm 947. Rotating the tensioner arm 947 has no impact on the height of the first pulley 942. Maintaining the cable 92 in place may be important in minimizing out of plane forces and in optimizing efficiency of the extension/retraction mechanism 100.

The connect lever 945 in turn is connected to the shaft 948 at one end and to the intermediate tensioner 943 at the other end, and the intermediate tensioner 943 is connected to linkage 45, in particular to an extension (e.g., shoulder bolt 455) arranged on a nose 453 of the linkage 45. The intermediate tensioner 943 has a slot 941 in which the shoulder bolt 455 (fixed at linkage 45) is movably arranged. During stowage movement, at the deployment angle α, the shoulder bolt 455 touches the forward edge 9411 of the slot 941 and transfers the motion of the linkage 45 into a rotational movement of the tensioner arm 947 (moving "up" via connect lever 945 and shaft 948), which in turn increases the tension in the retraction cable 92. The deployment angle α, at which the shoulder bolt 455 touches/un-touches (engages/disengages with) the forward edge 9411 is preferably the same as the deployment angle α, at which the nose 431 of linkage 43 touches/un-touches (engages/disengages with) cam stud 984 of cam 98. However, in some embodiment the two angles are different by a couple of degrees such as about 3 degrees, about 5 degrees or about 10 degrees.

The tensioner arm 947 acts to prevent the cable 92 from coming loose throughout all stages of the extension or retraction. An extension 31 is mounted at a long leg of the U of the frame plate 52 of the mounting fixture 50 and an extension spring 32 is connected between the extension 31 and the tensioner arm 947 to ensure that the cable 92 is not unseated from the pullies 942, 944 during stowage since slack may be created in the cable 92 when the leg rest 20 is stowed. The extension spring 32 may provide a constant tension in order to prevent the cable 92 from coming loose.

Slack in the cable 92 is not only possible when the leg rest 20 is stowed but also when it is deployed. Such as when a passenger forcibly retracts the leg rest pad 70 while the leg rest 20 is extended. Since the tensioner arm 947 is isolated from the rest of the retraction mechanism 90, it can react independently to these situations. Isolation is possible because of slot 941 in the intermediate tensioner 943 which allows the tensioner arm 947 to freely rotate in a direction that adds tension to the system at all angles of the leg rest 20.

The following paragraphs now describe the movement of the leg rest 20 in more detail. When the deployment and stowage mechanism 40 moves the leg rest 20 from the stowed position to the deployed position or vice versa then the linkages 43 and 45 pivot about axis B and axis A, respectively. At some point in time (e.g., at deployment angle α) cam 98 starts/stops rotating about axis F at the pivot point F' of mounting plate 55.

When the deployment and stowage mechanism 40 moves the leg rest 20 from the deployed position (that is consistent with the leg rest pad 70 and frame 60 being fully extended) to the stowed position it starts moving the linkages 43-46 but not the retraction cam 98 since the cam stud 984 of the retraction cam 98 is spaced apart from the linkage 43. Only when the deployment angle α is reached (see, e.g., FIG. 3A) the linkage 43 touches the cam stud 984 of the retraction cam 98. When the leg rest 20 is further pulled towards the stowed position the cam stud 984 starts moving along the side face and the non-linear surface (or nose) 431 of the linkage 43. The movement of the cam stud 984 over and along the side face of linkage 43 and the non-linear surface (or nose) 431 varies the speed of the cam 98 so that the leg rest 20 does not touch the cabin floor. Rotating the cam 98 provides an opposite force to the force provided by the extension mechanism 80 (e.g., spring) and reels in the cable 92 thereby moving the mounting fixture 50 and the extension frame 60 from a distal position to a proximal position. In other words the distance between the mounting fixture 50 and the extension frame 60 is shortened. The reel in force overcomes the extension force (e.g., the spring force which may always want to extend the extension frame 60 from the mounting fixture 50). Linkage 45 and the cable tensioner system 94 may be used in tandem with the cam 98 (and linkage 43) to further increase the acceleration of the retraction mechanism 90.

When the leg rest 20 undergoes the transition from deployed and fully extended to stowed, the linkage 43 moves in an anti-clockwise direction about axis B (in top view of the leg rest 20 and the seat 10, see FIG. 1A referencing FIG. 6A) so that the cam stud 984 eventually interacts with the nose 431 resulting in cam 98 rotating about axis F in an anti-clockwise direction until linkage 43 reaches its stowed position and stops rotation. By this motion of cam 98, the cable 92 is reeled in under the first pulley 942 and over the second pulley 944 and the extension frame 60 is moved towards the mounting fixture 50. When linkage 43 moves in an anti-clockwise direction linkage 45 moves in an anti-clockwise direction pivoting about axis A. This in turn moves the intermediate tensioner 943 and the connect lever 945 in a forward linear direction (towards shaft 948) which in turn rotates shaft 948 anti-clockwise and therefore moves the tensioner arm 947 anti-clockwise. This movement of the cable tensioner system 94 is able to provide tension to the cable 92. The tensioner arm 947 also provides tension to the cable 92 so that the cable 92 is not moved from the pullies 942, 944 when, e.g., a user (such as a passenger) tries to move the leg rest 20 towards its stowed/retracted position, or when a user, such as a child, jumps on the leg rest. This tensioner arm 947 may act as a dampener. Moreover, the motor 15 may handle deflections via a break.

When the leg rest 20 undergoes a transition from a stowed to a deployed position, the linkages 43 and 45 move in a clockwise rotation. The extension force provided by the extension mechanism 80, e.g., spring, is stronger than the retraction force provided by the cable tensioner system 94 thereby moving the extension frame 60 away from the mounting fixture 50 and thereby extending the space between the frame 60 and the fixture 50 (i.e., from a proximal position to a distal position). The spring force pushes the extension frame 60 away from the fixture 50. The frame 60 pulls the cable 92 thereby unreeling the cable 92 from the cam 98. Cam 98 may damp this movement. The cable tensioner system 94 and the linkages 43, 45 move in an opposite movement to the above-described movement, i.e., the elements move in a clockwise movement.

When the leg rest 20 is fully extended the cable tensioner system 94 may be configured to constantly apply tension to the cable 92. This prevents the likelihood that the cable 92 is unseated from the tensioning mechanism (e.g., the pullies 942, 944). In various embodiments the extension system 90 allows the fixture 50 and the frame 60 to be fully extended midway through the deployment process (at deployment angle α). In other words, the fixture 50 and the frame 60 are fully extended before the leg rest 20 reaches its fully deployed position. During the deployment of the leg rest 20, the cable tensioner system 94 is configured to dampen the speed and timing of the leg rest 20 extension. This helps to prevent the leg rest pad 70 to contact the cabin floor. As the deployment angle αα is decreased, the amount of cable tension is increased, which causes the leg rest 20 to retract. This allows the leg rest 20 to be retracted far enough for the stowage linkage 30 to engage with minimal torque impact. In various embodiments, when the leg rest 20 is fully stowed, the stowage linkage 30 takes all the load. That means the stowage linkage 30 removes tension provided by the springs 80 from the leg rest 20 and reduces stretching forces on the cable 92 over time. After the stowage linkage engages, spring 32 ensures that the cable stays seated on the pullies 942 and 944.

In various embodiments, the leg rest 20 may include a second deployment and stowage mechanism 40' with linkages 43'-46' (see, e.g., FIG. 2B or 3B). The second deployment and stowage mechanism 40' may be the same as or similar to the deployment and stowage mechanism 40. For example, the second deployment and stowage mechanism 40' may not interact with a second extension or retraction mechanism or not with a second retraction mechanism since these mechanisms are omitted from the leg rest 20. In this case, the linkage 43' may not have a nose (such as nose 431).

In various other embodiments, the leg rest 20 may include a second deployment and stowage mechanism 40 and a second extension and retraction mechanism 100. Of course the second extension and retraction mechanism includes a second extension mechanism and a second retraction mechanism with a second cable, a second cable tensioner system and a second cam. The second tensioner system may be arranged at the other long leg of the U of the frame structure 53 of the fixture 50 (not shown). The second cable may be fixed to frame 60 in a similar to or the same way as the other cable is fixed, and may be guided and fixed to the cable tensioner system and the cam in a similar to or the same way as the other cable 92 is guided or fixed.

Figure 7:
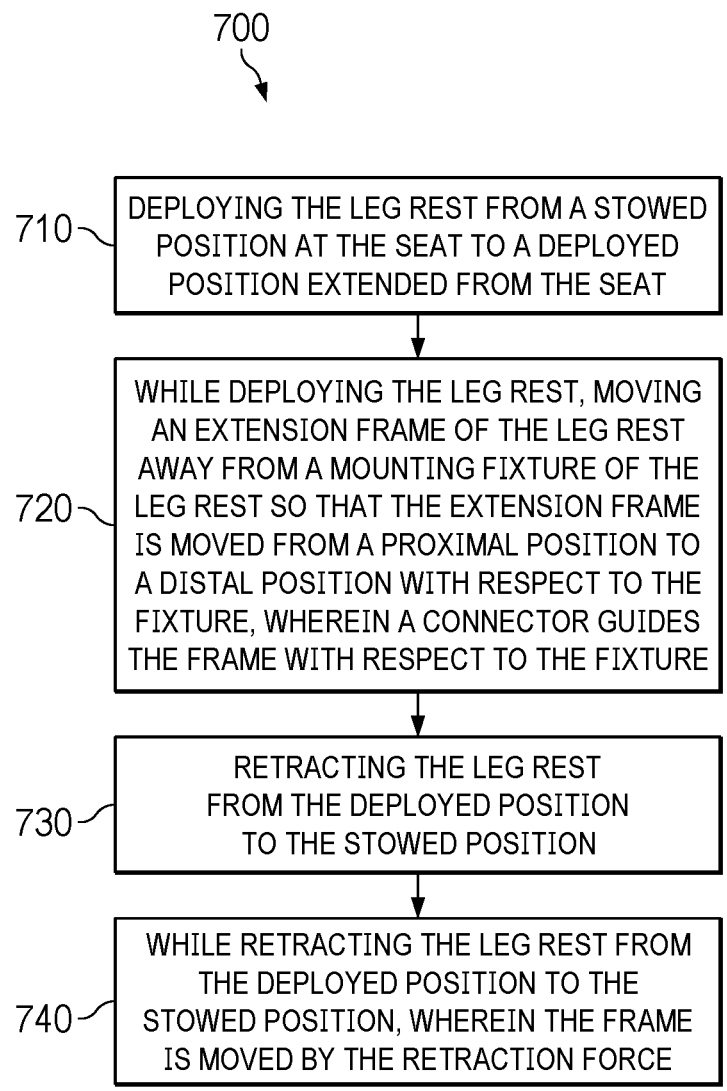
FIG. 7 shows a method for deploying and stowing the leg rest.

FIG. 7 shows a method 700 for extending a leg rest form a seat. The method 700 comprises, at 710, deploying the leg rest from a stowed position at the seat to a deployed position extended from the seat and, at 720, while deploying the leg rest, moving an extension frame of the leg rest away from a mounting fixture of the leg rest so that the extension frame is moved from a proximal position to a distal position with respect to the fixture, wherein a connector guides the frame with respect to the fixture, and wherein the frame is moved by an extension force being larger than a retraction force. The method further comprise, at 730, retracting the leg rest from the deployed position to the stowed position and, at 740, while retracting the leg rest, moving the frame towards the fixture so that the extension is moved from the distal position to the proximal position, wherein the frame is moved by the retraction force being larger than the extension force.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A leg rest comprising:
   a mounting fixture;
   an extension frame;
   a deployment and stowage mechanism configured to deploy the leg rest from or stow the leg rest to a seat;
   a connector arranged between the mounting fixture and the extension frame, the connector guiding the extension frame relative to the mounting fixture;
   an extension mechanism configured to provide an extending force between the mounting fixture and the extension frame; and
   a retraction mechanism configured to provide a retraction force between the mounting fixture to the extension frame, the retraction force being an opposite force to the extending force;
   wherein the extension frame is movably connected to the mounting fixture so that the extension frame moves relative to the mounting fixture when the deployment and stowage mechanism moves the leg rest relative to the seat;
   wherein the deployment and stowage mechanism comprises a base plate fixedly connected to the mounting fixture, a first linkage, a second linkage, a third linkage and a fourth linkage;
   wherein one end of the first linkage is movably connected to the base plate and another end of the first linkage is movably connected to the third linkage additionally, the fourth linkage being movably connected to the middle of the first linkage;
   wherein one end of the second linkage is movably connected to the base plate and another end of the second linkage is movably connected to a first end of the fourth linkage;
   wherein one end of the third linkage is movably connected to the first linkage and another end of the third linkage is connectable to a motor; and
   wherein one end of the fourth linkage is movably connected to the second linkage and another end of the fourth linkage is connectable to the motor, a middle part of the fourth linkage is movably connected to the middle part of the first linkage.

2. The leg rest according to claim 1, wherein the connector is a telescope rail, the extension mechanism is a spring and the retraction mechanism comprises a cable.

3. The leg rest according to claim 2, wherein the spring is arranged below the telescope rail, and wherein one end of the spring is fixed to the extension frame and another end of the spring is fixed to the mounting fixture.

4. The leg rest according to claim 2, wherein only the fourth linkage is drivable by the motor.

5. The leg rest according to claim 2, wherein the retraction mechanism comprises a retraction cam and the cable, the cable being fixed to the extension frame, and wherein the retraction cam is connected to an extension extending from the mounting fixture.

6. The leg rest according to claim 5, wherein the deployment and stowage mechanism is configured to deploy the leg rest from the seat via the first to fourth linkages, and wherein, at the same time, the extension mechanism is configured to force the extension frame away from the mounting fixture, thereby moving the extension frame from a proximal position to a distal position relative to the mounting fixture.

7. The leg rest according to claim 5, wherein the deployment and stowage mechanism is configured to stow the leg rest to the seat via the first to fourth linkages, and wherein, at the same time, the retraction mechanism is configured to force the extension frame towards the mounting fixture, thereby moving the extension frame from a distal position to a proximal position relative to the mounting fixture.

8. The leg rest according to claim 7, wherein the first linkage is configured to move in an anti-clockwise direction when the leg rest is being stowed, thereby moving the retraction cam in the anti-clockwise direction so that the retraction cam reels in the cable.

9. The leg rest according to claim 1, wherein the extension frame has a U-shape and the mounting fixture has a U-shape, wherein open parts of the U-shapes face each other, and wherein long legs of the U-shapes partially overlap each other.

10. A leg rest comprising:
    a mounting fixture and an extension frame comprising a leg rest pad;
    a first telescope rail arranged between the mounting fixture and the extension frame guidably connecting the extension frame and the mounting fixture;
    a spring arranged between the mounting fixture and the extension frame, the spring configured to provide a force to move the extension frame to a distal position relative to the mounting fixture;
    a retraction mechanism comprising a cam and a cable, wherein the cam is pivotally connected to the mounting fixture, and wherein one end of the cable is connected to the extension frame and another end of the cable is connected to the cam; and
    a deployment and stowage mechanism comprising a plurality of linkages configured to deploy or stow the leg rest from a seat,
    wherein, when the deployment and stowage mechanism stows the leg rest, the cam is pivotally rotated by a first linkage of the plurality of linkages thereby reeling in the cable and moving the extension frame from the distal position with respect to the mounting fixture to a proximal position with respect to the mounting fixture.

11. The leg rest according to claim 10, wherein the mounting fixture has a U-shape, wherein the extension frame has a U-shape, wherein open portions of the U-shapes face each other, wherein the first telescope rail is arranged at a first long leg of the U-shape of the extension frame and at a first long leg of the U-shape of the mounting fixture, and wherein a second telescope rail is arranged at a second long leg of the U-shape of the extension frame and at a second long leg of the U-shape of the mounting fixture.

12. The leg rest according to claim 11, wherein the U-shape of the mounting fixture is an asymmetric U-shape, and wherein the cable is guided through a top side of a leg of the U-shape of the mounting fixture and is fixed to the extension frame.

13. The leg rest according to claim 11, wherein the retraction mechanism further comprises a cable tensioner system comprising a rotatable tensioner shaft fixed to a top side of a leg of the U-shape of the mounting fixture, wherein the rotatable tensioner shaft is connected to a tensioner arm on one side and to a second linkage of the plurality of linkages via a connect lever and an intermediate tensioner on a second side, wherein a first pulley is arranged at the rotatable tensioner shaft and a second pulley is arranged at the tensioner arm, and wherein the cable is guided under the first pulley and over the second pulley.

14. The leg rest according to claim 13, wherein the second linkage is configured to move the connect lever and the intermediate tensioner so that the rotatable tensioner shaft rotates and so that the tensioner arm tensions the cable.

15. The leg rest according to claim 14, wherein the second linkage is configured to move the connect lever and the intermediate tensioner only as of a deployment angle $\alpha$.

16. The leg rest according to claim 10, further comprising a leg rest pad in the form of a cushion fixedly arranged on the extension frame.

17. The leg rest according to claim 10, wherein the cam is pivotally rotated by the first linkage only as of a deployment angle $\alpha$.

18. A method for extending a leg rest from a seat, the method comprising:
deploying the leg rest, using a deployment and stowage mechanism comprising a plurality of linkages configured to deploy or stow the leg rest, from a stowed position at the seat to a deployed position extended from the seat;
while deploying the leg rest, moving an extension frame of the leg rest away from a mounting fixture of the leg rest so that the extension frame is moved from a proximal position with respect to the mounting fixture to a distal position by a spring arranged between the mounting fixture and the extension frame, wherein the spring is configured to provide a force to move the extension frame to the distal position, wherein a connector guides the extension frame with respect to the mounting fixture, and wherein the extension frame is moved by an extension force being larger than a retraction force;
retracting, using a retraction mechanism that is of the deployment and stowage mechanism and that comprises a cam and a cable connected between the extension frame and the cam, the leg rest from the deployed position to the stowed position; and
while retracting the leg rest, moving the extension frame towards the mounting fixture so that the extension frame is moved from the distal position to the proximal position by pivotally rotating the cam by a first linkage of the plurality of linkages thereby retracting the cable and moving the extension frame from the distal position to the proximal position, wherein the extension frame is moved by the retraction force being larger than the extension force.

* * * * *